United States Patent [19]
Kline, Jr.

[11] 3,932,965
[45] Jan. 20, 1976

[54] METHOD FOR TIRE TREAD FINISHING

[75] Inventor: Crandall R. Kline, Jr., Akron, Ohio

[73] Assignee: The Goodyear Tire & Rubber Company, Akron, Ohio

[22] Filed: Mar. 24, 1975

[21] Appl. No.: 561,137

[52] U.S. Cl.................... 51/281; 51/106 R; 51/327; 51/DIG. 33
[51] Int. Cl.²......................................... B64B 1/00
[58] Field of Search......... 156/75, 96, 98, 110, 128, 156/405; 51/106 R, DIG. 33, 281, 327; 157/13 R

[56] References Cited
UNITED STATES PATENTS

| | | | |
|---|---|---|---|
| 3,491,493 | 1/1970 | Deist............................. | 51/DIG. 33 |
| 3,724,137 | 4/1973 | Hofect............................. | 51/106 R |
| 3,848,368 | 11/1974 | Toshioka............................. | 51/106 R |

Primary Examiner—Stanley H. Tollberg
Attorney, Agent, or Firm—F. W. Brunner; R. S. Washburn

[57] ABSTRACT

The surface appearance of a tire tread finished by grinding to alleviate force variations in the tire is improved by reversing the grinding mode of one of the usual two grinding wheels. The effect is particularly useful in tires having large open block pattern treads as in mud and snow tires.

4 Claims, 4 Drawing Figures

METHOD FOR TIRE TREAD FINISHING

The foregoing abstract is not to be taken as limiting the invention of this application, and in order to understand the full nature and extent of the technical disclosure of this application, reference must be made to the accompanying drawing and the following detailed description.

The present invention relates to pneumatic tires and to forming the road contact surface of such tires. Particularly, the invention relates to grinding arcuate portions of the tread of such tires to form a surface thereon. More particularly, the invention is related to mud and snow tires and the forming of road contact surfaces thereon by grinding.

It is known to remove material from the road contact surface or tread of tires, particularly by grinding, buffing, or the like, for diverse purposes. Customarily, there is no requirement as to the quality of the appearance of the surface of the tire after such material has been removed. More recently it has been common practice to grind certain portions of the tire, removing material from such portions for the purpose of reducing the variations in the force exerted by the tire on a load wheel engaged in loaded rolling contact with the tire.

Principal objects of the present invention are to provide a tire the appearance of the surface of which is improved relative to the appearance of the surface of the tire conventionally finished by grinding or buffing, and to provide a method for obtaining by grinding such improved surface finish appearance.

To acquaint persons skilled in the art with the nature and principles of the invention, a presently preferred embodiment of the best mode now contemplated for putting the invention into practice, will be described by and in connection with the accompanying drawings, in which.

Figure 1:
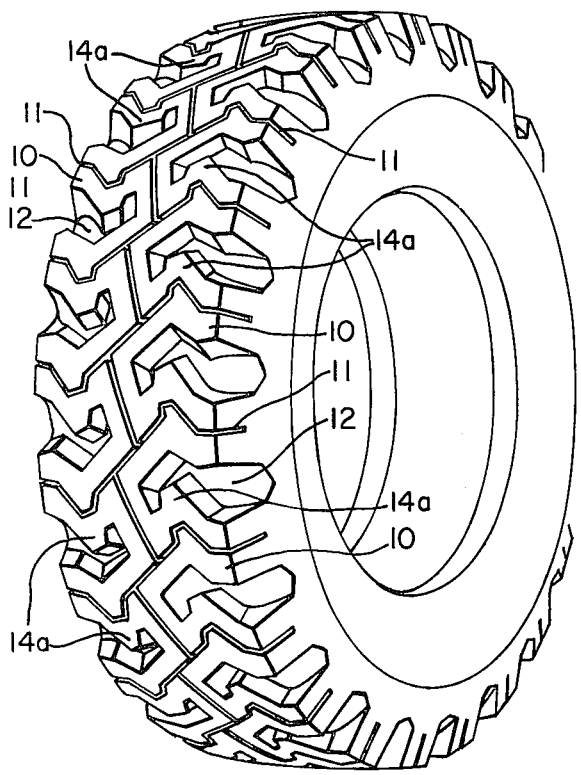
FIG. 1 is a pictorial view of a tire in accordance with the invention.

The tire in accordance with the invention, FIG. 1, is illustrative of a type or class of tires with which the invention is particularly concerned. The tire comprises a tread, sidewalls, and respective bead portions, for mounting the tire on a flanged wheel in the usual manner. Tires of the class illustrated are commonly referred to as snow tires or mud tires, or mud and snow tires, for the reason that the configuration of the tread portion is designed to provide improved traction when operated in snow, mud, or like difficult conditions of the road or other surface to be traveled by the tire.

The present invention is particularly concerned with the appearance of the surface of the tire in its new, unworn condition when the tire is placed on sale.

As will be observed in the figure, the road contact surface of the tread is provided by a plurality of traction blocks 10. The blocks are spaced apart about the circumference of the tire alternately with the traction grooves 11. In the particular tire illustrated, each traction block surrounds an additional and wider groove 12. The arrangement is such that portions of each traction block resemble chevrons 14 having the closed apex-like portion 14a of the chevron pointed upwardly in the figure in that portion of the tire tread disposed on the right of a mid-circumferential plane. The chevron orientation of the corresponding blocks disposed at the left of the mid-circumferential plane of the tire, as seen in FIG. 1, have their closed or apex-like portions pointed downwardly and opposite to those on the right. This arrangement, of course, repeats around the circumference of the tire.

In accordance with the present invention, it has now been discovered that in removing material from the tread surface by grinding, as hereinbefore mentioned, the surface finish of the tire tends to be less than fully satisfactory in its appearance and that some of the edges formed by the intersection of the road contact surface and the respective grooves tend not to be clean, sharp, and well defined. It has further been found that this less than satisfactory surface finish of those portions which have been ground also obtains when the relative direction of the two grinding wheels with respect to the tire surface, is reversed. It has now been discovered to the contrary that a definite and worthwhile improvement in the surface appearance of the tire is achieved by driving each of two grinding wheels in a rotational sense opposite to the rotational sense of the other of the grinding wheels such that one of the grinding wheels while engaged in material removing contact with the rotating tire cuts in an up-grinding mode and that the other of the grinding wheels while engaged in such material removing contact with the rotating tire cuts in a down-grinding mode. Up and down grinding modes will be described presently in connection with reference to FIGS. 3 and 4.

Figure 2:
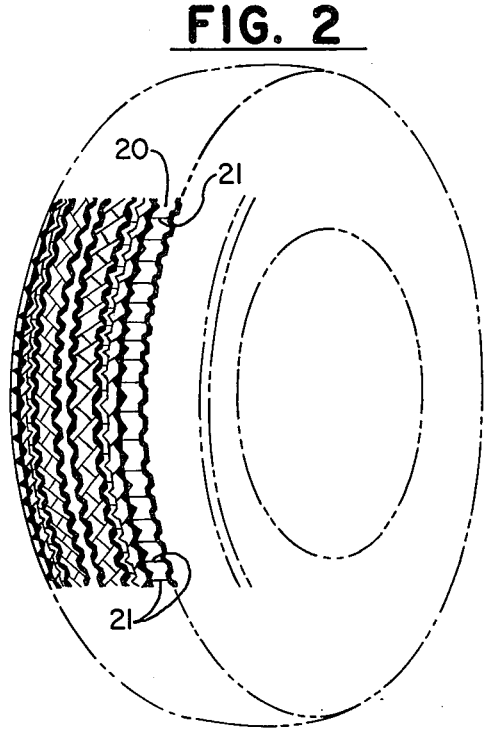
FIG. 2 is another tire in accordance with the invention.

Turning now to FIG. 2 wherein is illustrated a tire of conventional tread pattern having likewise traction blocks 20 and grooves 21 in alternating sequence about the circumference of the tire. It will likewise be observed that in the tire of FIG. 2 a substantial portion of such traction blocks and grooves have forms which at the road contact surface of the tread at least resemble the chevron arrangement described in connection with FIG. 1. The principal difference, as is well known, lies in the relative size and number of the traction blocks and the intervening grooves.

Figure 4:
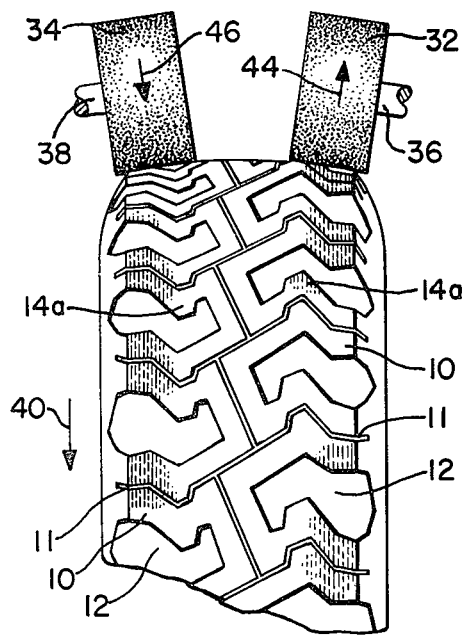
FIG. 4 is another view of the arrangement of FIG. 3, taken as indicated by the line 4—4 in FIG. 3.
Figure 3:
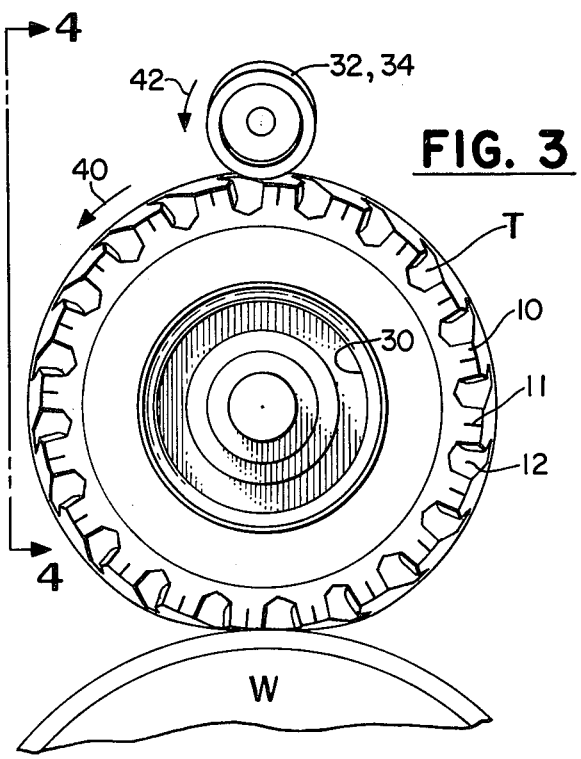
FIG. 3 is a diagrammatic view of a tire being engaged by grinding wheels in the practice of the invention.

FIGS. 3 and 4 illustrate a tire T mounted and inflated on a chuck 30 which is power driven to rotate the tire. The tire may be engaged by a load wheel W in loaded rolling contact with the tire, which load wheel is provided with strain sensors and associated control mechanism (not shown) by which the two grinding wheels 32, 34 are moved into material removing contact with the tread, or out of such contact in response to load variations experienced by the sensors. The two grinding wheels are each mounted on motor driven spindles 36, 38 for rotation at constant speeds. The tire is rotated in the direction of the arrow 40. In practice in accordance with the prior art heretofore, both of the two grinding wheels were rotated in the direction of the arrow 42, whereas in accordance with the present invention, one of the two grinding wheels is rotated in the opposite direction, as seen in FIG. 4, relative to the rotation of the other, as is indicated by the arrows 44 and 46.

The grinding wheels are themselves of conventional construction comprising a steel shell with suitable provision for mounting on the motor driven spindles. The shell is coated with a metallic binder containing a grit of a metal carbide such as tungsten carbide, or the like. Such grinding wheels are readily available from, for example, Tunco Products, Div. of Burgess-Norton Mfg. Co., Geneva, Illinois.

Reference is made herein and in the claims appended hereto to up-grinding and to down-grinding. Up-grinding, which is the conventional grinding mode, describes the relative motion of the grinding face of the grinding wheel and the surface being ground of the tire wherein the respective surface directions in the zone of grinding contact are opposite to each other such that the first contact of a representative single grit in the grinding wheel face first comes into contact with a surface of the tread at the full depth of the cut and moves arcuately upwardly and outwardly through the material which is being removed. It is thus defined as cutting upward or up from the level of the surface already cut by the wheel as the surface of the tread progresses into the contact zone. Down-grinding, sometimes called "climb grinding", describes the condition wherein the single grit in the grinding face of the wheel first contacts that portion of the surface material not yet removed and progresses downwardly along an arc toward the surface finished by the grinding operation. In the climb-grinding mode, the surface of the tire being ground and the surface of the grinding face of the wheel are moving in the same direction in the zone of contact, whereas in up-grinding the respective surfaces are moving oppositely in the zone of grinding contact. The surprising and unexpected effect in quality of surface appearance of the tire is attained by the application to a single tire of the two entirely opposite modes of grinding by using two independently driven grinding wheels rotating in the opposite modes of grinding.

While certain representative embodiments and details have been shown for the purpose of illustrating the invention, it will be apparent to those skilled in the art that various changes and modifications may be made therein without departing from the spirit or scope of the invention.

What is claimed is:

1. In a process for grinding arcuate portions of the tread of an inflated pneumatic tire near the lateral edge or edges of such tread to reduce variations in force exerted by such tire on the surface of a load measuring wheel, and in which process the tire is mounted and inflated on a power driven rotating chuck in a machine having a fully rotatable load measuring wheel for engaging the tread of the tire in loaded rolling contact and two grinding wheels driven at grinding speed to remove material from said arcuate portions engageable and disengageable with said portions in response to variations in load exerted on said wheel by said tire; the improvement comprising: driving each of said grinding wheels in a rotational sense opposite to the rotational sense of the other of said grinding wheels, such that one of said grinding wheels while engaged in material removing contact with the rotating tire cuts in an up-grinding mode and the other of said grinding wheels while engaged in material removing contact with the rotating tire cuts in a down grinding mode whereby the surface appearance of the tread of the tire is improved relative to the appearance thereof by rotating both said grinding wheels in a usual common directional sense.

2. In a process for grinding arcuate portions of the tread of an inflated pneumatic tire near the lateral edge or edges of such tread to reduce variations in force exerted by such tire on the surface of a load measuring wheel, and in which process the tire is mounted and inflated on a power driven rotating chuck in a machine having a fully rotatable load measuring wheel for engaging the tread of the tire in loaded rolling contact and two grinding wheels driven at grinding speed to remove material from said arcuate portions engageable and disengageable with said portions in response to variations in load exerted on said wheel by said tire, and wherein the tread is characterized by traction blocks and grooves spaced in alternating sequence about the circumference, the blocks and the grooves having at the tread surface a chevron-like shape protruding in one direction at one side of the mid-circumferential tire plane and in the other direction at the other side of said plane, the improvement comprising: driving each of said grinding wheels in a rotational sense opposite to the rotational sense of the other of said grinding wheels, such that one of said grinding wheels while engaged in material removing contact with the rotating tire cuts in an up-grinding mode and the other of said grinding wheels while engaged in material removing contact with the rotating tire cuts in a down grinding mode whereby the surface appearance of the tread of the tire is improved relative to the appearance thereof by rotating both said grinding wheels in a usual common directional sense.

3. In a process for grinding arc portions of minor parts of the width of a tire tread, said parts being spaced apart oppositely outward of the midcircumferential plane of the tire and wherein the tire is rotated in a first rotational sense and two separate and independent grinding wheels engage respectively the opposed minor parts of the tread width, the improvement comprising, rotating one of said grinding wheels in a first sense the same as said first rotational sense such that the surface of said tire and the surface of said one grinding wheel both travel through the grinding zone therebetween in the same direction and concurrently, rotating the other of said grinding wheels in the opposing sense, such that the respective said surfaces travel through their grinding zone in directions opposite each other, whereby the tire tread is ground by down-grinding in one of its said parts and by up-grinding in the other of its said parts.

4. In a process for grinding arc portions of minor parts of the width of a tire tread, said parts being spaced apart oppositely outward of the midcircumferential plane of the tire and wherein the tire is rotated in a first rotational sense and two separate and independent grinding wheels engage respectively the opposed minor parts of the tread width, the improvement comprising, rotating one of said grinding wheels in a first sense the same as said first rotational sense such that the surface of said tire and the surface of said one grinding wheel both travel through the grinding zone therebetween in the same direction and concurrently, rotating the other of said grinding wheels in the opposing sense, such that the respective said surfaces travel through their grinding zone in directions opposite each other, whereby the tire tread is ground by down-grinding in one of its said parts and by upgrinding in the other of its said parts, and wherein the tread is characterized by traction blocks and grooves spaced in alternating sequence about the circumference, the blocks and the grooves having at the tread surface a chevron-like shape protruding in one direction at one side of the mid-circumferential tire plane and in the other direction at the other side of said plane.

* * * * *